S. D. Payne,
Paper Box.

No. 106,719.     Patented Aug. 23, 1870.

WITNESSES

UNITED STATES PATENT OFFICE.

SANFORD D. PAYNE, OF KASOTA, MINNESOTA.

IMPROVED FRUIT-BASKET.

Specification forming part of Letters Patent No. 106,719, dated August 23, 1870.

*To all whom it may concern:*

Be it known that I, SANFORD D. PAYNE, of Kasota, in the county of Le Sueur and State of Minnesota, have invented a new and useful Improvement in Fruit and other Baskets, of which the following is a full, clear, and exact description, reference being had to the accompanying drawing, forming a part of this specification, and in which—

Figure 3:
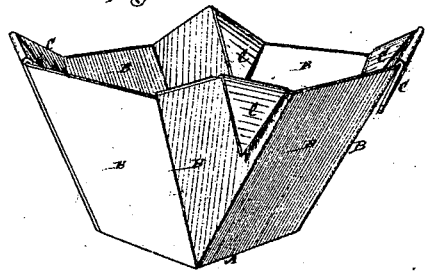
Figure 2:
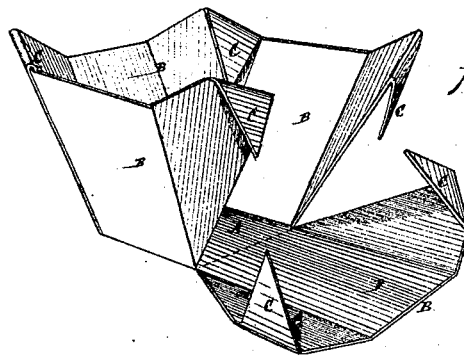
Figure 1:
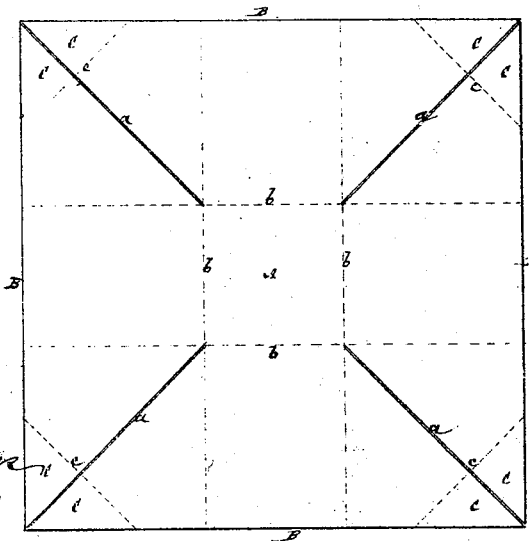

Figure 1 represents a blank, out of which the basket is made by cutting and folding, or a basket taken apart or unfolded to the shape of the blank from which it was made; Fig. 2, a view, in perspective, of my improved basket with one of its sides only let down or unfolded, and Fig. 3 a similar view of the basket with its sides closed.

Similar letters of reference indicate corresponding parts.

My invention relates to a basket mainly intended for the vending of fruit, and designed to be given away along with the contents of the basket at the time of sale.

To this end, without restriction, however, to the use of the basket, the invention consists in a basket made of paper, card, pasteboard, or other equivalent material, cut and folded in such a manner as to form a basket, the sides of which are supported, the one by the other, and held in place without pasting or stitching, or, at least, without, of necessity, so securing them, or employing any independent fastening.

A basket may thus be made which is at once cheap and easy to manufacture. The same may, if desired, be fitted with a false bottom, and have a water-proof wash applied to it.

Referring to the accompanying drawing, I take, as represented in Fig. 1, a rectangular sheet of paper, card, or pasteboard, of any suitable size, according to the dimensions required for the basket, and make four diagonal or partially-diagonal cuts, $a\ a\ a\ a$, in it, and then bend up the sheet at the inner ends of said cuts, in the lines $b\ b\ b\ b$, successively, till the cut edge of each portion B lies in the same plane as the line $b$, which connects the base or lower ends of said cut portion. In this way the cut portions B are made to overlap and form sides to the basket, of which A is the bottom, (see Figs. 1, 2, and 3,) leaving angular projections or corner-pieces C, the bases of which are represented by the dotted lines $c\ c\ c\ c$, and which are successively turned over externally and internally.

What is here claimed, and desired to be secured by Letters Patent, is—

A basket made of paper, card, pasteboard, or other suitable material, cut and folded substantially as shown and described, and whereby its sides are held in place by the folding of the cut portions, essentially as specified.

SANFORD D. PAYNE.

Witnesses:
J. W. BABCOCK,
M. E. BABCOCK.